United States Patent [19]

Le Mer et al.

[11] Patent Number: 5,016,922
[45] Date of Patent: May 21, 1991

[54] PIPE COUPLINGS

[75] Inventors: Joseph Le Mer, St Thegonnec; Jean-Luc Derrien, Pordic, both of France

[73] Assignee: Chaffoteaux et Maury, France

[21] Appl. No.: 547,134

[22] Filed: Jul. 3, 1990

[30] Foreign Application Priority Data

Jul. 3, 1989 [FR] France ................. 89 08894

[51] Int. Cl.$^5$ .................................. F16L 35/00
[52] U.S. Cl. ........................ 285/81; 285/305
[58] Field of Search ................... 285/305, 81

[56] References Cited

U.S. PATENT DOCUMENTS

| 1,019,000 | 2/1912 | Watson | 285/305 X |
| 2,092,243 | 9/1937 | Breese | 285/305 X |
| 2,108,265 | 2/1938 | Martin et al. | 285/305 X |
| 3,527,485 | 9/1970 | Goward et al. | 285/305 |
| 3,753,582 | 8/1973 | Graham | 284/305 |
| 4,244,608 | 1/1981 | Stuemky | 285/305 |
| 4,869,534 | 9/1989 | Ketcham et al. | 285/305 X |
| 4,938,510 | 7/1990 | Gmeiner et al. | 285/305 X |

*Primary Examiner*—Dave W. Arola
*Attorney, Agent, or Firm*—Larson and Taylor

[57] ABSTRACT

To connect two pipes together, a female end-piece (1) is fitted thereon comprising an annular seal housed in an annular cup (2) and a pin (6) guided in transverse slides (9) and, respectively, a male end-piece ending in a collar and adapted to crush the seal axially. The pin comprises two arms (8) whose end sections ($8_2$) allow the collar to pass axially and whose base sections ($8_1$) on the contrary serve for clamping the collar axially against the seal, these base sections ending in ramps (R) facilitating the beginning of cooperation between the arms and collar. Hooks (12) limit the outgoing travel of the pin.

3 Claims, 1 Drawing Sheet

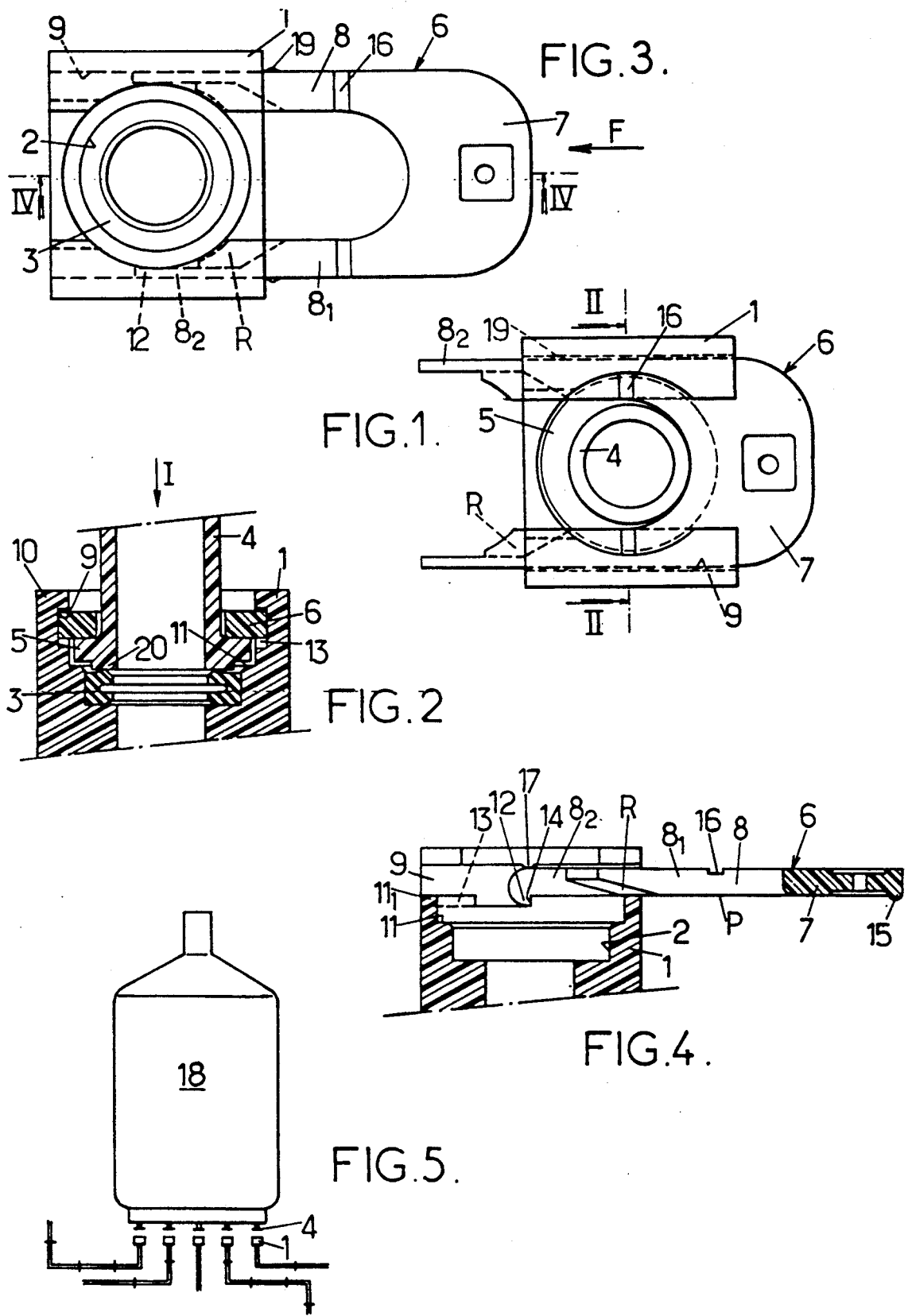

PIPE COUPLINGS

The invention relates to pipe couplings.

It relates more particularly, among the pipe couplings of the kind in question, but not exclusively, to those providing the connection between a plurality of first end-pieces fixed to a common rack and as many second end-pieces ending external pipes and whose positions are not strictly determined with respect to the first end-pieces.

Among the couplings of this latter type, those may in particular be mentioned which are used for connecting the pressurized water and pressurized gas circuits of water heaters, bath heaters or central heating boilers to the corresponding external water and gas piping.

In a way known per se, the couplings considered here comprise: a male end-piece adapted to be permanently and sealingly fixed on one end of a first pipe, a female end-piece adapted to be permanently and sealingly fixed on an end of a second pipe, two surfaces of revolution provided respectively on the two end-pieces and adapted for defining together an annular cavity, an annular seal housed in said cavity so as to be applied simultaneously against the two surfaces, two parallel rectilinear slides formed transversely in the female end-piece, a collar provided on the male end-piece, which collar has a flat annular surface in the transverse plane of the slides the furthest away from the free end of this end-piece, and a pin, the two arms of which are adapted to cooperate with the two slides, these arms comprising respectively two end portions spaced sufficiently apart from each other to let the collar pass axially and two base sections too close together to allow the collar to pass and adapted for abutting axially against this collar while preventing the mutual axial separation of the two end-pieces and surrounding, with slight play, the portion concerned of the male end-piece, the ends of the arms of the pin ending in hooks adapted to abut against bearings of the female end-piece when the pin reaches the end of its normal outgoing travel, the positions of said bearings being determined so that abutment of the hooks against these bearings corresponds just to the complete axial release of the collar by the arms of the pin.

Couplings of this kind are economic and have the advantage of lending themselves to very quick fitting and removal.

But, in known embodiments thereof, one of the two surfaces of revolution defining the housing of the seal is a cylindrical surface against which the seal comes radially into contact with possibilities of relative axial sliding.

The sealing which results may be sufficient for some applications such as coupling pipes for watering, but it is not sufficient for the above mentioned applications.

An object of the invention is especially to make the couplings of the kind in question such that they provide improved sealing.

For this, the couplings according to the invention are essentially characterized in that the surfaces of revolution defining the housing for the annular seal are respectively a cup formed in the female end-piece, open axially towards the exit of this end-piece and a flat end ring of the male end-piece, and in that the face of each base section of the pin, adapted to bear axially on the collar, comprises a ramp arranged so that sliding of the pin when fitting results in causing the pin to about axially and progressively against the collar and so axially and progressively compressing the seal against the bottom of the cup.

In preferred embodiments, recourse is further had to one/and or other of the following arrangements: the annular seal has a profile open radially towards its axis, the axially facing faces of the pin and of the slides have complementary hollows and reliefs for cooperating in the manner of a ratchet when the pin reaches its most transversely driven in position and which corresponds to the most axially compressed condition of the seal, the pin has at least one boss adapted to abut against a surface of the female end-piece when the pin is in its most transversely disengaged position, which prevents the involuntary movement of the pin from this position.

Apart from these main arrangements, the invention comprises certain other arrangements which are preferably used at the same time and which will be more explicitly discussed hereafter.

In what follows, a preferred embodiment of the invention will be described with reference to the accompanying drawings in a way which is of course in no wise limitative.

FIGS. 1 and 2 of these drawings show a pipe coupling formed in accordance with the invention in its coupled condition, i.e. with the pin driven in, respectively in an axial view in the direction of arrow I, in FIG. 2 and in axial section through II—II of FIG. 1, FIG. 3 shows similarly to FIG. 1 the same coupling male end-piece has been removed, in its condition ready to receive this end-piece, i.e. with the pin pulled out, FIG. 4 shows in axial section through IV—IV of FIG. 3 the coupling of FIG. 3, but with the seal removed, FIG. 5 shows very schematically a combined boiler, i.e. for heating water for the central heating by circulation of hot water through radiators and for drawing off domestic hot water, which boiler is equipped with five couplings according to the invention.

The coupling considered comprises: a female end-piece 1 having one end adapted, for example threaded, so as to be permanently and sealingly connected to a first pipe and, on the other side, an end cup 2 (FIG. 4) open axially to the outside, an annular seal 3 (FIG. 2) housed in cup 2, and a male end-piece 4 of a general cylindrical shape comprising one end adapted, for example threaded, so as to be able to be permanently and sealingly coupled to a second pipe and, on the other side, an external collar 5 (FIGS. 1 and 2) whose inner portion is itself extended axially by a flat annular step 20 (FIG. 4).

To make the desired sealed coupling between the two above pipes, i.e. between the two end-pieces 1 and 2, it is necessary to clamp the collar 5 against the bottom of cup 2 with compressing of the intermediate seal 3 and to maintain it clamped.

Instead of providing such clamping as is known by screwing, which is time consuming, difficult to proportion, requires strict axial alignment of the end-pieces to be connected and leads to the production of expensive parts, said clamping is here obtained with ideal proportioning by simple transverse rectilinear sliding of a pin 6, without it being necessary to comply with strict conditions of axial alignment of the end-pieces, and without needing to use expensive parts, in fact quite the contrary, since the different elements forming the coupling, except for the seal, namely the two end-pieces and the pin, may be made from a moulded synthetic material at a low cost price.

Pin 6 is a flat and thin part with a bottom 7 of relatively large height and two rectilinear and relatively thin arms 8.

Arms 8 are received in two rectilinear grooves or slides 9 formed in the internal edge of cup 2 or more precisely in two parallel flanges 10 extending said cup edge axially outwardly.

These grooves or slides 9 have a U shaped cross section and are open towards each other, namely in a transverse direction of the coupling.

Each arm 8 has a prismatic external surface whose profile or contour is substantially complementary to that of one of grooves 9, which allows the sliding of said arms 8 to be guided along said grooves 9.

Each arm 8 comprises a base section $8_1$ extended by an end section $8_2$.

The end sections $8_2$ are sufficiently narrow for the collar 5 and seal 3 to be able to pass axially therebetween, as can be seen in FIG. 3.

As for the transverse thickness of the base sections $8_1$, it is chosen so that the cylindrical portion of the male end-piece 4 may again pass therebetween, but not the collar 5, as can be seen in FIG. 1.

The internal portion of each base section $8_1$, which portion projects transversely inwards of the pin, with respect to the corresponding end section $8_2$, has a flat transverse face P on the cup 2 side (FIG. 4).

It is this face P which is applied axially against collar 5 for providing sealed coupling between the two end-pieces.

Said face P is extended at the end, of the base section $8_1$ considered, the furthest away from the bottom 7 of the pin, by a ramp R which is slanted, as can be seen in FIGS. 1 and 4, so as to facilitate the beginning of sliding contact between pin 6 and collar 5 to be locked.

The operation of the coupling thus described is the following.

Initially, pin 6 is in an outmost position such as can be seen in FIG. 3, so that access to cup 2 is axially free for seal 3 and collar 5.

Seal 3 is then positioned (FIGS. 2 and 3) in cup 2.

As can be seen in FIG. 2, this seal 3 advantageously has a profile open towards the axis of the coupling, so that it tends to open axially all the more so the higher the pressure of the internal fluid, which provides very efficient sealing and absolute locking of the pin.

On fitting, the axial thickness of seal 3 is greater than that of cup 2 which receives it, decreased by that of the inner end annular step 20 of end-piece 4.

Then, collar 5 of end-piece 4 is positioned facing an annular seat 11 provided for it at the axial exit of cup 2, which seat is edged by a cylindrical wall $11_1$ (FIG. 4), which causes the annular step 20 of said endpiece to rest on seal 3.

Then a slight axial pressure is applied on this endpiece 4, which causes seal 3 to be compressed by step 20, and pin 6 is pushed in transversely in the direction of arrow F (FIG. 3).

The ramps R of this pin then come into contact with collar 5, then its faces P and, when the pin 6 has reached the end of its transverse inward travel as can be seen in FIG. 1, it is said faces P which, bearing axially against collar 5, provide permanent axial compression of seal 3 and so sealing and irreversibility of the coupling between the two end-pieces 1 and 4.

At the ends of arms 8 of the pin, hooks or noses 12 are provided projecting from these arms in the direction of cup 2 (see FIG. 4).

Widened inlets 13 for slides 9 are formed in flanges 10 for slidingly receiving said hooks 12.

The bottoms of these widened inlets are defined by steps or bearings 14 whose positioning is provided so that, when each hook 12 abuts against the associated bearings 14, which corresponds to the end of the normal outgoing travel of pin 6, the later is just in its position in which it makes possible complete axial accessibility to housings 2 and 11, $11_1$ for seal 3 and collar 5.

This arrangement is advantageous in that it limits the outgoing travel of pins 6, which avoids losing them.

Of course, a possibility must be provided for fitting each pin 6 on the corresponding end-piece 1. Such fitting takes place in the opposite direction to that of arrow F, by first introducing the bottom 7 of this pin in the opening defined by the two grooves 9.

In FIG. 4 can be further seen: at 15, a small boss provided on the bottom of pin 6 for preventing this pin being too easily removed in the direction of arrow F, at 19, other small bosses or barbs provided on the outer edges of the arms of the pin and adapted to abut against facing surfaces of end-piece 1 such as the edges of the exit orifices of slides 9 so as to prevent involuntary reentry of the pin when it is in its maximum disengaged or extended position (FIG. 3), at 16 and 17, small complementary hollows and reliefs, such as grooves and ribs, provided respectively on axially facing faces of pin 6 and its housing and adapted to cooperate in the manner of a ratchet when the pin reaches its fully driven in position (FIG. 1) thus to prevent the involuntary movement of this pin towards its exit.

It should be noted that such cooperation between the hollows and reliefs 16 and 17 may be firmly provided by the very pressure of the fluid contained in the coupling, in particular when seal 3 has the open profile mentioned above: in this case, it is not possible to remove the coupling as long as the internal pressure is maintained, which forms a very important advantage from the dual point of view of sealing and safety.

Following which, and whatever the embodiment adopted, a coupling is finally obtained whose construction and operation follow sufficiently from the foregoing.

This coupling has numerous advantages with respect to those known heretofore, particularly in so far as the quality of the sealing provided by axial compression of the seal is concerned, economy since each of the main components of the coupling (end-pieces 1, 4 and pin 6) may be made from a moulded synthetic material at a low cost price, speed and reliability of fitting, which may be ensured by simple rectilinear sliding of pin 6, simplicity of removal which may itself be obtained by simply sliding said pin 6 in the direction opposite the preceding one, and the possibility of forming connections between endpieces which are not strictly aligned, the transverse shift between these end-pieces possibly reaching several millimetres.

It is in fact possible to provide relatively considerable play between collar 5 and its housing 11, $11_1$ in endpiece 1 and the collar may occupy any one of the different relative offset positions made possible by the existence of this play.

From this last remark it follows that the invention is particularly advantageous in the case where it is necessary to form a plurality of connections between first end-pieces 4 carried by a fixed common rack and a plurality of second end-pieces 1 whose transverse positions with respect to the first ones are not defined with great accuracy.

This is in particular the case when the rack on which the first end-pieces are mounted is the base of a hot water generator such as a water heater, bath heater, or central heating boiler by way of illustration, a combined boiler has been shown schematically at 18 in FIG. 5, namely a boiler for heating the water for central heating by the circulation of hot water through radiators and for drawing off domestic hot water; this boiler comprises five water couplings formed in accordance with the invention, one for the gas and two for each of the two heating and drawing off circuits, one of the two couplings of each pair corresponding to the intake of water to be heated and the other the outgoing hot water.

As is evident, and as it follows moreover already from what has gone before, the invention is in no wise limited to those of its modes and application and embodiments which have been more especially considered, it embraces, on the contrary, all variants thereof.

We claim:

1. A pipe coupling comprising a male end-piece adapted to be permanently and sealingly fixed on one end of a first pipe said male end piece having a free end terminating in a flat end ring, a female end-piece adapted to be permanently and sealingly fixed on an end of a second pipe, said female end piece having bearing areas, two surfaces of revolution provided respectively on the two end-pieces and adapted for defining together an annular cavity, an annular seal housed in said cavity so as to be applied simultaneously against the two surfaces, two parallel slides formed transversely in the female end-piece and defining substantially parallel rectilinear slides, a collar provided on the male end-piece, which collar has a transverse flat annular surface, and a pin having two arms adapted to cooperate with the two slides, said slides and arms having opposing axially directed faces, said arms comprising respectively two end portions spaced sufficiently apart from each other to let the collar pass axially between them and two base sections too close together to allow the collar to pass between them and said axially directed faces of said arms being adapted for abutting axially against said flat annular surface of said collar thereby preventing the mutual axial separation of the two end-pieces and surrounding, with slight play, the portion of the male end-piece adjacent said collar, the ends of the arms of the pin ending in hooks adapted to abut against said bearing areas of the female end-piece when the pin reaches the end of its normal outgoing travel, the positions of said bearing areas being determined so that abutment of the hooks against said bearing areas corresponds just to the complete axial release of the collar by the arms of the pin by alignment of said end portions with said collar, characterized in that the surfaces of revolution defining the housing for the annular seal are respectively a cup formed in the female end-piece, open axially towards the exit of said female end-piece and said flat end ring of said axially directed male end piece, in that the face, of each base section of the pin, adapted to bear axially on said flat annular surface of said collar, comprises a flat transverse face which is extended at the end, of said base section, the furthest away from the bottom of the pin, by a ramp arranged so as to facilitate the beginning of sliding contact between the pin and the collar to be locked, and in that the opposing axially directed faces of the pin and of the slides have complementary hollows and reliefs for mutually cooperating when the pin reaches its most transversely engaged position to thereby prevent involuntary movement of this pin towards its exit.

2. A coupling according to claim 1, characterized in hat the annular seal has a profile open radially towards its axis.

3. A coupling according to claim 1, characterized in that the pin has at least one boss adapted to abut against a surface of the female end-piece when the pin is in its most transversely disengaged position, which prevents the involuntary movement of the pin from this position toward said engaged position.

* * * * *